United States Patent [19]
Hickey

[11] Patent Number: 5,966,828
[45] Date of Patent: Oct. 19, 1999

[54] ELECTRICAL BOX SETTING GUIDE APPARATUS AND METHOD

[76] Inventor: Robert T. Hickey, 4121 Wildwood Way, Shingle Springs, Calif. 95682

[21] Appl. No.: 08/947,769

[22] Filed: Oct. 9, 1997

Related U.S. Application Data

[60] Provisional application No. 60/028,196, Oct. 10, 1996.

[51] Int. Cl.⁶ .............................. B25B 11/00; B23Q 3/00
[52] U.S. Cl. ........................................ 33/528; 33/DIG. 10
[58] Field of Search .............................. 33/528, DIG. 10, 33/613, 562

[56] References Cited

U.S. PATENT DOCUMENTS

| | | | |
|---|---|---|---|
| 2,919,913 | 1/1960 | Phair | 33/DIG. 10 |
| 2,962,281 | 11/1960 | Hodgson | 33/DIG. 10 |
| 4,850,115 | 7/1989 | Price et al. | 33/528 |
| 5,072,523 | 12/1991 | Bennett | 33/528 |

*Primary Examiner*—Christopher W. Fulton
*Attorney, Agent, or Firm*—John P. O'Banion

[57] ABSTRACT

An electrical box setting apparatus for positioning electrical boxes on wood or metal wall studs. A back plate includes a pair of slidably adjustable blocks and a spacer bar between the blocks. The thickness of the spacer bar is chosen to match the thickness of sheet rock to be installed on a wall constructed with wood studs. To install an electrical box, the sliding blocks are positioned to the vertical elevation desired for the electrical box, the apparatus is positioned so that the blocks straddle the stud and the spacer bar abuts the stud, and the electrical box is placed on one of the sliding blocks and attached to the stud at that position. For metal studs, the spacer bar is removed or the adjustable blocks are relocated to the opposite face of the back plate.

8 Claims, 6 Drawing Sheets

ELECTRICAL BOX SETTING GUIDE APPARATUS AND METHOD

CROSS-REFERENCE TO RELATED APPLICATIONS

This application claims priority from U.S. provisional application Ser. No. 60/028,196 filed on Oct. 10, 1996, entitled "Electrical Box Setting Guide Apparatus" which is incorporated by reference herein in its entirety.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

This invention pertains generally to devices and methods for the installation of electrical boxes for electric power receptacles and the like, and more particularly to an electrical box setting guide apparatus for use on wood and metal wall studs which provides for quick, easy and accurate vertical and horizontal positioning of electrical boxes on studs.

2. Description of the Background Art

During construction of residential, commercial and other building structures, electrical boxes are generally installed in walls by attaching the electrical boxes to studs or support members in the wall prior to covering the wall with drywall or sheet rock. The electrical boxes generally must be placed at a uniform height or elevation from the floor, and must be positioned to allow installation of the drywall sheets. Prior to installation of the drywall, the electrical boxes are attached to the sides of the stud so that the front face or edge of the electrical box will be flush with the surface of the subsequently installed drywall. When wood studs are utilized in a wall, the front face of the electrical box is generally set out or positioned to extend outward from the front surface of the stud, and the drywall later installed covers the front surface of the stud. With the use of metal studs, the electrical boxes are generally positioned or set with the front face of the box being flush with the front edge of the stud, and the drywall is later installed to abut the stud without covering it.

Typically, a person installing electrical boxes on studs will determine positions for the boxes with a tape measure by measuring and marking a horizontal distance from the front or outer face of the stud as required by the drywall thickness, and measuring and marking a vertical distance from the floor along the stud as required for the height of the electrical fixture carried by the electrical box. In the case of wood studs, the electrical box is generally nailed to the stud at the measured position. With metal studs, holes are drilled in the stud at the marked position, and the electrical box is attached thereto by screws or bolts.

The above positioning procedure is prone to inaccuracy and frequently can lead to incorrect positioning of electrical boxes. If an error occurs in the horizontal positioning, the drywall or sheet rock will not be flush with the edge of the electrical box. The box must be detached, repositioned so that the electrical box is flush with the drywall, and again reattached to the stud, resulting in inconvenience and delay. Failure to reposition the electrical box results in an uneven drywall finish around the electrical box. Incorrect vertical positioning of the electrical boxes must also be corrected by detachment, repositioning and reattachment or otherwise the electrical fixtures along the wall will be at different elevations, which detracts from the appearance of the finished wall. Presently, there are no devices or methods available which overcome the difficulties involved in positioning or setting electrical boxes on studs.

Thus, there is a need for an electrical box setting guide apparatus which allows quick, easy and accurate vertical and horizontal positioning of electrical boxes on studs, which automatically positions the electrical box to be flush with subsequently installed drywall sheets, and which can be used with both wood and metal studs. The present invention satisfies these needs, as well as others, and generally overcomes the deficiencies found in the background art.

BRIEF SUMMARY OF THE INVENTION

The present invention is an electrical box setting guide apparatus for use with wood and metal wall studs during the construction of residential, commercial or other structures having electrical power outlets. The invention provides for the precise vertical and horizontal positioning of electrical boxes on studs, automatically positions the electrical box to be flush with subsequently installed drywall sheets, eliminates the need for measuring or determining positions with a tape measure, and is quick and easy to use. In general terms, the invention comprises a back plate with a pair of slots or tracks, a pair of vertical positioning blocks slidably mounted in the slots, and a spacer bar detachably coupled to the back plate.

By way of example, and not of limitation, the back plate has top and bottom ends, and front and back faces. First and second elongated, parallel, spaced apart slots extend longitudinally along the back plate. First and second vertical positioning blocks are slidably mounted in the slots by means of bolts, screws or like hardware which can be loosened to allow positional adjustment of the blocks, and then tightened to retain the adjusted position of the blocks. The first and second blocks are engaged in the slots such that the blocks are located on the front face of the back plate for use with wood studs. For use with metal studs the blocks can be repositioned to the rear face of the back plate. The first and second blocks and first and second tracks are spaced apart by a sufficient distance so that a standard wall stud such as a "two-by-four" can fit between the first and second blocks and tracks. The spacer bar is preferably of elongated configuration, and attaches to the front face of the back plate between the first and second blocks and first and second tracks. The thickness of the spacer bar is chosen to be equal to the thickness of the drywall or sheet rock to be used.

In an alternative embodiment of the invention, a single block is slidably mounted in both the first and second slots. The block itself acts as a spacer, and the horizontal thickness of the block is chosen to match the thickness of the drywall material to be used.

The electrical box setting guide apparatus is utilized to attach electrical boxes onto the wall studs of a room prior to the installation of sheet rock. With wooden studs, the apparatus is used by attaching a spacer bar of desired thickness to the front face of the back plate. When, for example, standard one half inch thick sheet rock will be used to finish the walls of the room, a spacer bar of one half inch thickness is used. The first and second blocks are slidably positioned or set at a desired distance from the bottom end of the back plate. The distance chosen will generally correspond to the desired vertical distance or position of the electrical boxes with respect to the floor. The blocks are then tightened or secured in the adjusted position. The apparatus is held against a stud, with the bottom end of the back plate resting on the floor, with the spacer bar adjacent the front of the stud, and with the stud positioned between the first and second sliding blocks so that the blocks are adjacent the sides of the stud. An electrical box is then placed on the first or second block to set the position of the electrical box, and the box is nailed to the stud or attached with screws in a conventional manner. The spacer bar automatically provides the correct horizontal positioning for the electrical box so that the box will be flush with the drywall when it is put in place. The slidably adjusted blocks automatically provide the desired vertical positioning for the electrical box relative to the floor of the room. The invention thus eliminates the need for positioning of electrical boxes by measuring each position with a tape measure, which is tedious, time consuming and prone to errors.

The invention is used with metal wall support studs in a generally similar manner, but with the blocks relocated to the rear face of the back plate. The blocks are slidably positioned and tightened to provide the desired vertical positioning. The apparatus is held against a stud, with the bottom end of the back plate resting on the floor, with the rear face of the back plate adjacent the front of the stud, and with the stud positioned between the first and second blocks. The electrical box is placed on the first or second block to set the position of the electrical box, holes are drilled at the set position, and the box is attached to the stud with bolts in a standard fashion. Alternatively, the spacer bar can be removed from the front face of the back plate and the blocks left on the front face of the back plate, and the front face of the back plate placed against the stud.

An object of the invention is to provide an electrical box setting guide apparatus for use with wood and metal wall studs during the construction of residential commercial or other structures having electrical power outlets.

Another object of the invention is to provide an electrical box setting guide apparatus which allows precise vertical and horizontal positioning of electrical boxes on studs.

Another object of the invention is to provide an electrical box setting guide apparatus which automatically positions the electrical box to be flush with subsequently installed drywall sheets.

Another object of the invention is to provide an electrical box setting guide apparatus which eliminates the need for positioning electrical boxes with a tape measure.

Another object of the invention is to provide an electrical box setting guide apparatus which quick and easy to use.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts without departing from the basic concepts as disclosed herein.

Figure 1:
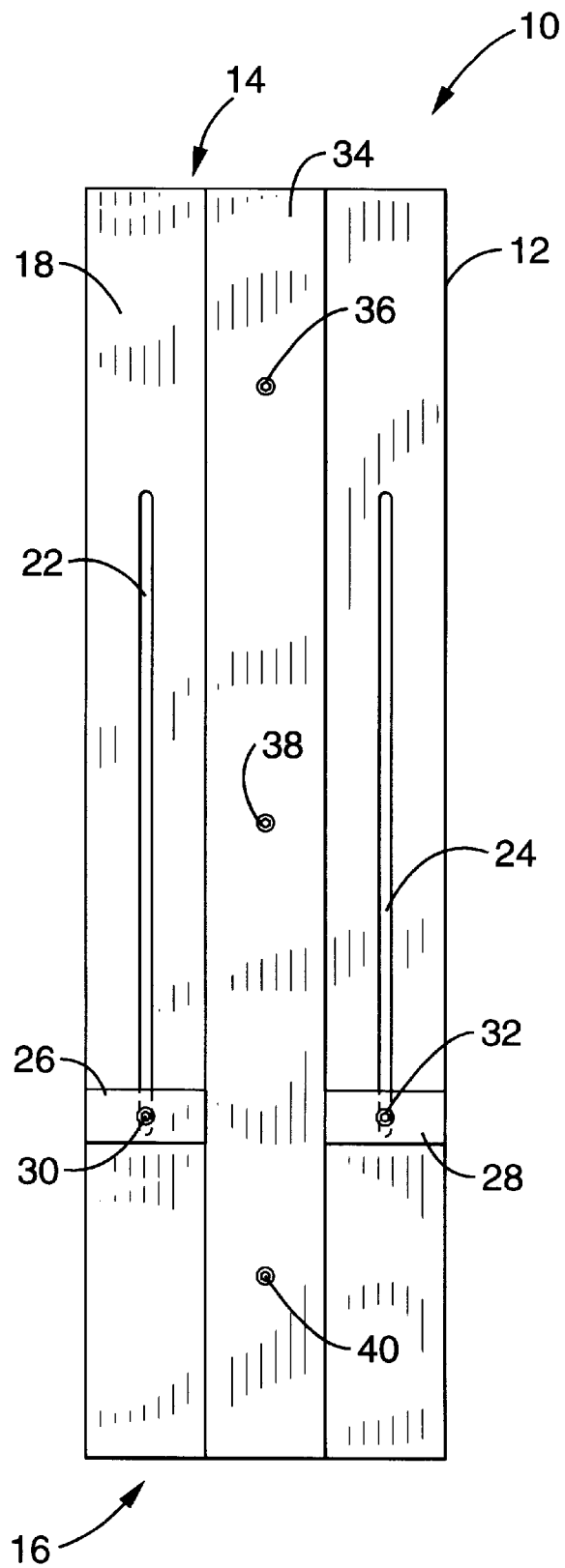
FIG. 1 is a front elevation view of an electrical box setting guide apparatus in accordance with the present invention.
Figure 2:
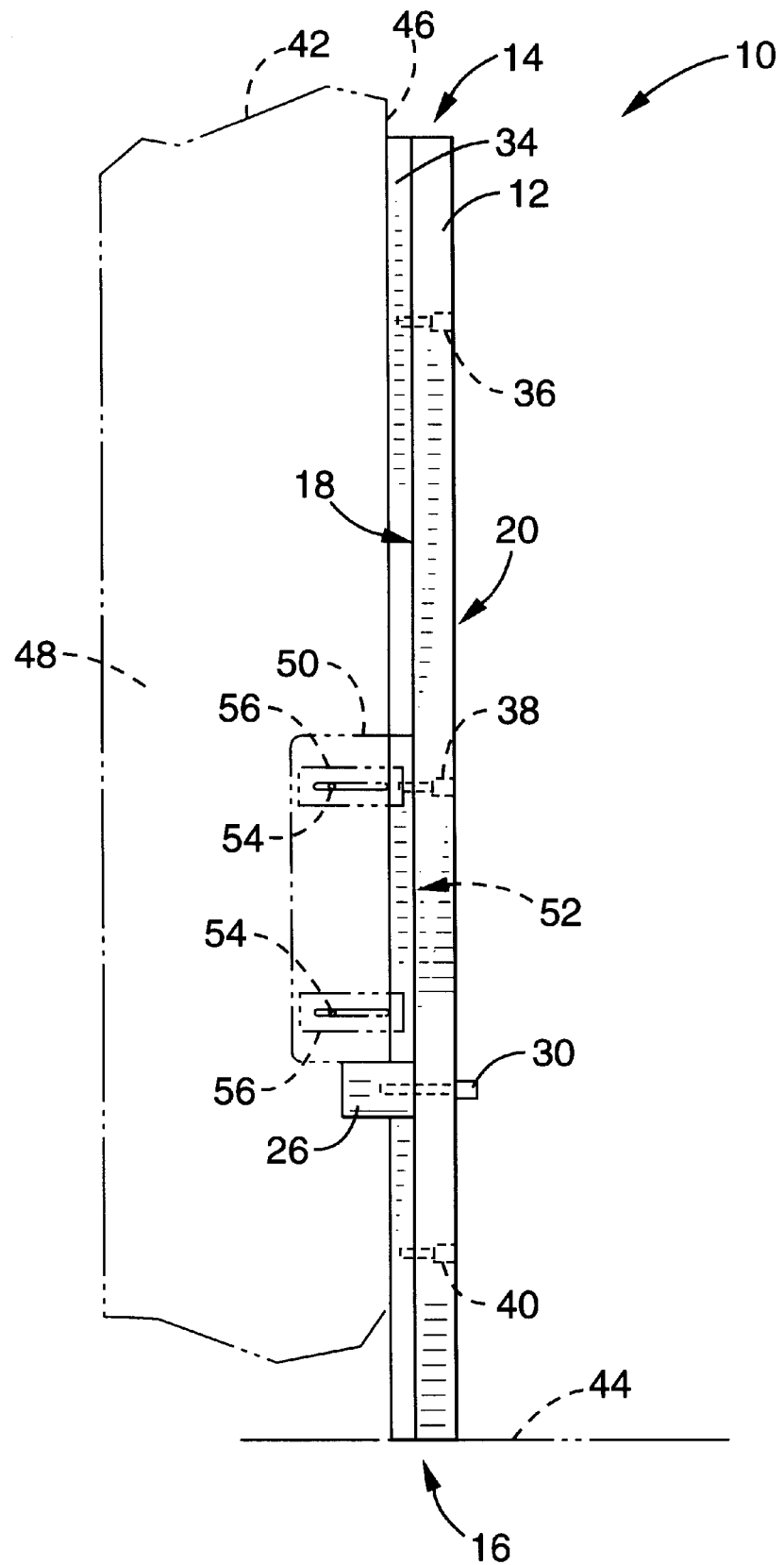
FIG. 2 is a side elevation view of the electrical box setting guide apparatus of FIG. 1 shown positioned adjacent to a wood stud and electrical box in phantom.

Referring first to FIG. 1 and FIG. 2, an electrical box setting guide apparatus 10 in accordance with the invention is generally shown. Apparatus 10 is shown in FIG. 1 and FIG. 2 structured and configured for use with conventional wood studs such as "two-by-fours." Apparatus 10 generally comprises a back plate 12 having a top end 14, a bottom end 16, a front face 18, and a back face 20. Back plate 12 is preferably of elongated configuration as shown. Means for vertically positioning an electrical box are provided in the form of first and second slots or tracks 22, 24 on back plate 12. First and second slots 22, 24 are of generally elongated, generally longitudinal construction, and preferably are spaced apart from each other and generally parallel to each other as shown. First and second slots 22, 24 preferably extend through back plate 12 and communicate with front and back faces 18, 20. Back plate 12 is shown with an exaggerated thickness for clarity.

The vertical positioning means also comprises first and second vertical position blocks 26, 28 which are movably or slidably mounted on front face 18 of back plate 12 by slots 22, 24. Bolts 30, 32 extend through slots 22, 24 and attach blocks 26, 28 respectively to back plate 12. Bolts 30, 32 may be loosened by hand by a wing nut (not shown) or by a suitable tool to allow blocks 26, 28 to be slidably positioned on back plate 12, and then tightened to retain blocks 26, 28 in the adjusted position.

Means for horizontally positioning an electrical box relative to a wood stud are included with the invention, and preferably comprise a stud plate or spacer bar 34 located on front face 18 of back plate 12. Spacer bar 34 is preferably of elongated configuration, and is positioned on front face 18 between and generally parallel to slots 22, 24. Preferably, spacer bar 34 is detachably coupled to back plate 12 by screws 36, 38, 40. Other releasable coupling means such as snap fitting arrangements may also be used to attached spacer bar 34 to back plate 12. Alternatively, spacer bar 34 may be integral to back plate 12.

The electrical box setting guide apparatus 10 is used by attaching spacer bar 34 to front face 18 of back plate 12. Bolts 30, 32 are loosened, and blocks 26, 28 are slidably positioned on back plate 12 by sliding bolts 30, 32 within slots 22, 24 until blocks 26, 28 are in a desired vertical position with respect to top and bottom ends 14, 16 of back plate 12, and then bolts 30, 32 are tightened to lock or retain blocks 26, 28 in their adjusted positions. Generally, blocks 26, 28 are placed at the same vertical position.

Referring more particularly to FIG. 2, once blocks 26, 28 are locked in position, the apparatus 10 is positioned adjacent a wooden wall stud 42, with bottom end 16 of back plate adjacent the floor 44, with spacer bar 34 adjacent the front edge 46 of the stud 42, and with blocks 26, 28 straddling the sides 48 of stud 42. An electrical box 50 is placed or set on block 26 (or block 28) adjacent side 48 of stud 42 and oriented such that a side (not shown) of the box 50 is adjacent side 48 of stud, and with the front face 52 of the box generally adjacent front face 18 of back plate 12. The box 50 is then attached to stud 42 in a conventional fashion by driving nails 54 through slots or holes 56 in box 50 and into the wood of stud 42. Since spacer bar 34 holds back plate 12 out away from front 46 of stud 42 by a predetermined distance (equal to the thickness of spacer bar 34), front face 52 of box 50 is set out or extends outward relative to front 46 of stud 42.

Once electrical box 50 has been fastened to stud 42, the setting apparatus 10 can be removed from stud 42 and used to position another electrical box 50 on another stud 42 in the same manner. Electrical box 50 is correctly positioned vertically on stud 42 by blocks 26, 28, which have been preset to the desired height from floor 44 as described above. Electrical box 50 is also correctly positioned horizontally on stud 42 by spacer bar 34, so that the correct amount of space or distance is provided between the front of electrical box 50 and stud 42 for installation of drywall (not shown). The apparatus provides the same horizontal and vertical positioning for each electrical box installed. No individual measurements are required, and the use of a tape measure is not necessary. The electrical box setting guide apparatus 10 thus provides quick, easy, and repeatedly accurate positioning for electrical boxes on wall studs.

Figure 3:
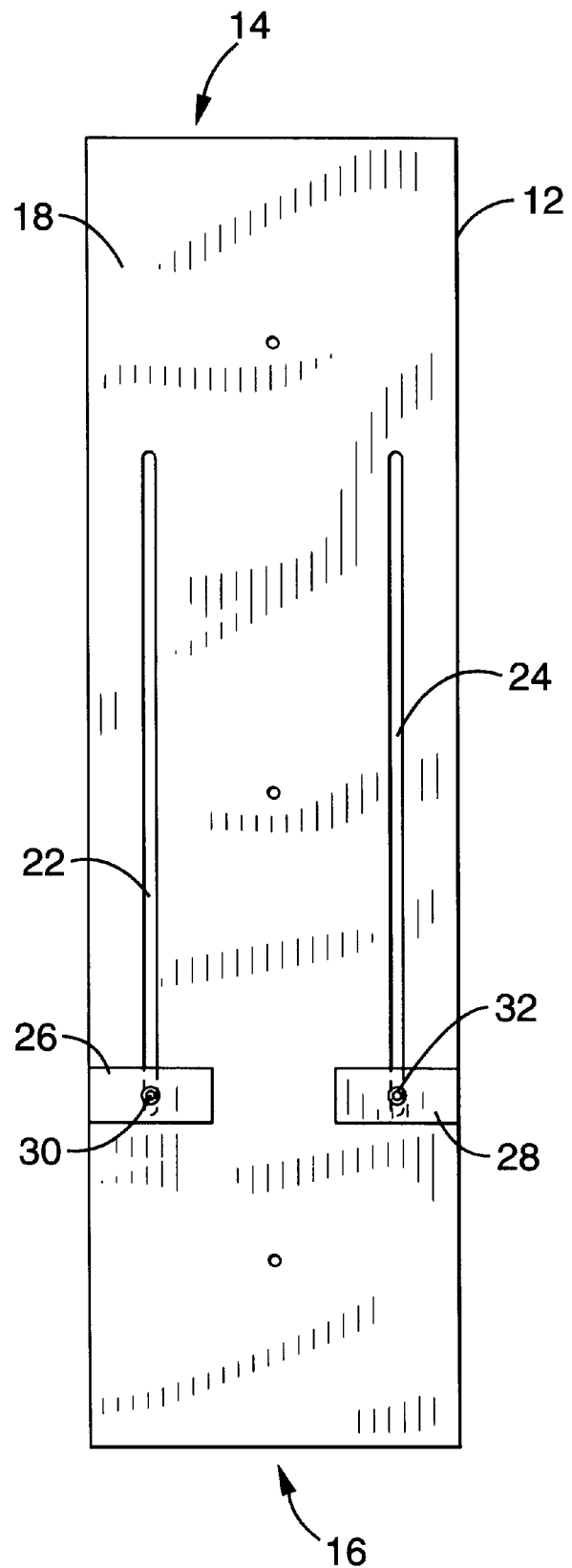
FIG. 3 is a front elevation view of an electrical box setting guide apparatus of FIG. 1 shown with the space bar removed.
Figure 4:
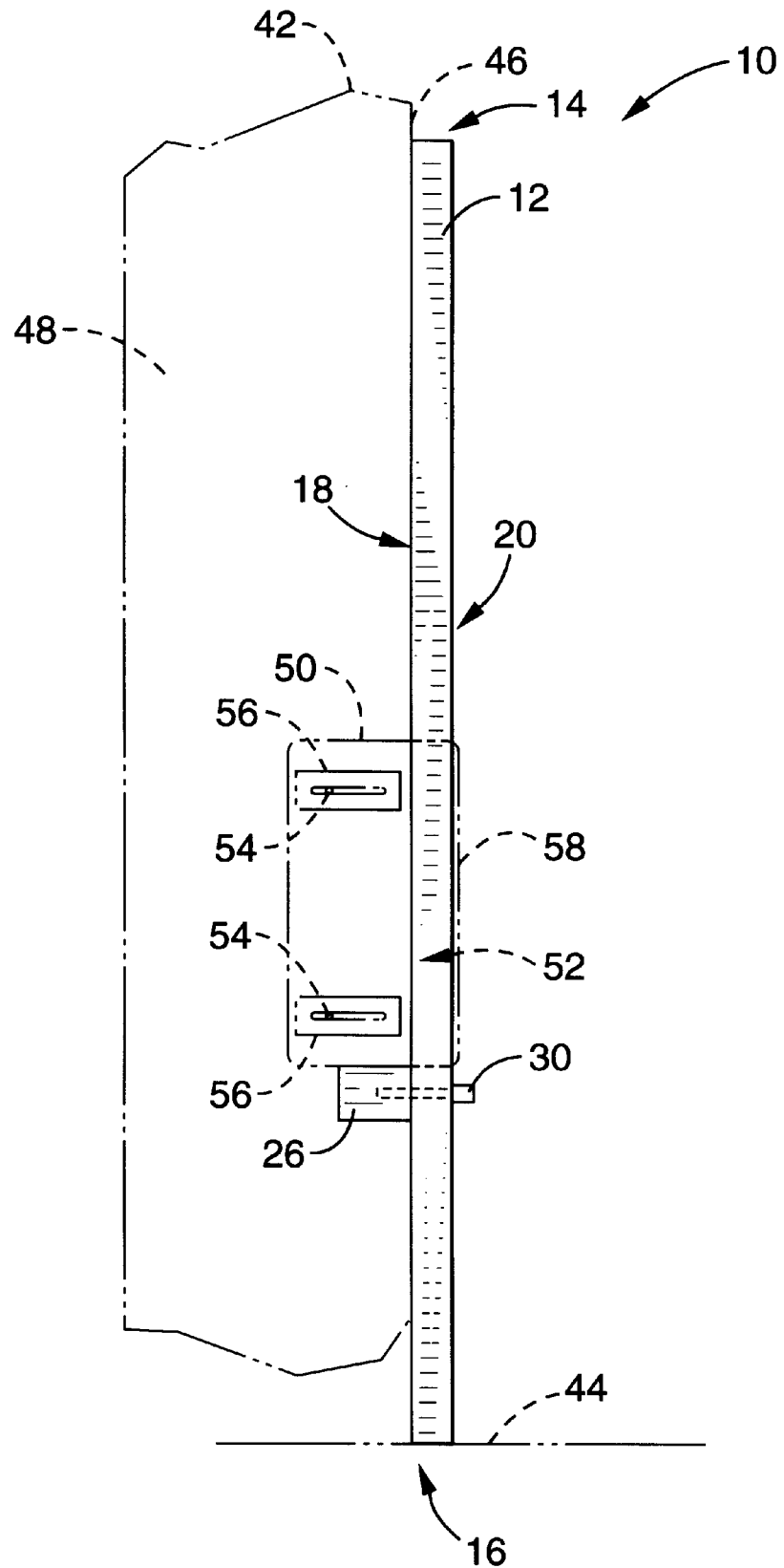
FIG. 4 is a side elevation view of the electrical box setting guide apparatus of FIG. 3 shown positioned adjacent to a metal stud and electrical box in phantom.

Referring next to FIG. 3 and FIG. 4, the electrical box setting guide apparatus 10 is shown with the spacer bar 34 removed for installation of electrical boxes on metal studs. When used with metal stud 42, blocks 26, 28 are slidably positioned on back plate 12 with respect to top and bottom ends 14, 16 as described above. The apparatus 10 is positioned adjacent wall stud 42, with bottom end 16 of back plate adjacent the floor 44, with front face 18 of back plate 12 adjacent the front edge 46 of the stud 42, and with blocks 26, 28 straddling the sides 48 of stud 42. Electrical box 50 is placed on block 26 (or block 28) adjacent side 48 of stud 42 and oriented with a side of box 50 adjacent side 48 of stud, and with the front face 52 of box 50 adjacent front face 18 of back plate 12. Since spacer bar 34 has been removed, front face 52 of box 50 is flush with the front 46 of stud 42 when front face 52 of box 50 is adjacent front face 18 of back plate 12. The box 50 is then attached to the stud in a conventional fashion by drilling holes (not shown) and placing screws or bolts 54 through slots 56 in box 50 and into the metal of stud 42. A cowl 58 is generally included on the front face 52 of box which extends outward from front face and provides a boundary for subsequently installed drywall (not shown).

Figure 5:
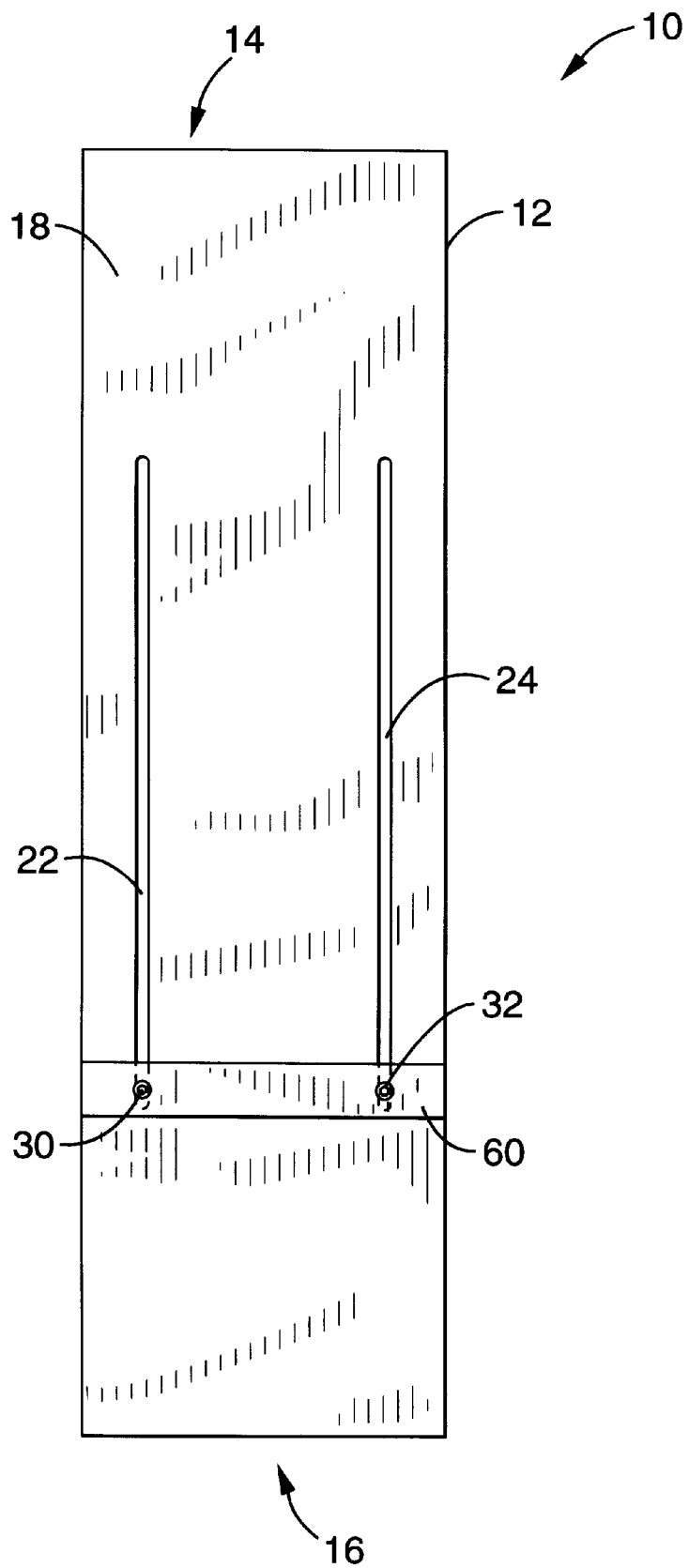
FIG. 5 is a front elevation view of an alternative embodiment electrical box setting guide apparatus in accordance with the present invention employing a single block configuration.

Referring now to FIG. 5, an alternative embodiment of electrical box setting guide apparatus 10 is generally shown, wherein like reference numerals denote like parts. The apparatus 10 includes a single, horizontally elongated sliding spacer block 60 which is slidably mounted onto back plate 12 by screws 30, 32 through slots 22, 24. Spacer block 60 is structured and configured to match the drywall thickness, and serves the same function provided by spacer bar 34 described above. In all other respects, the electrical box setting guide apparatus 10 is used in the same manner as described above for the apparatus 10 with spacer bar 34 attached.

Figure 6:
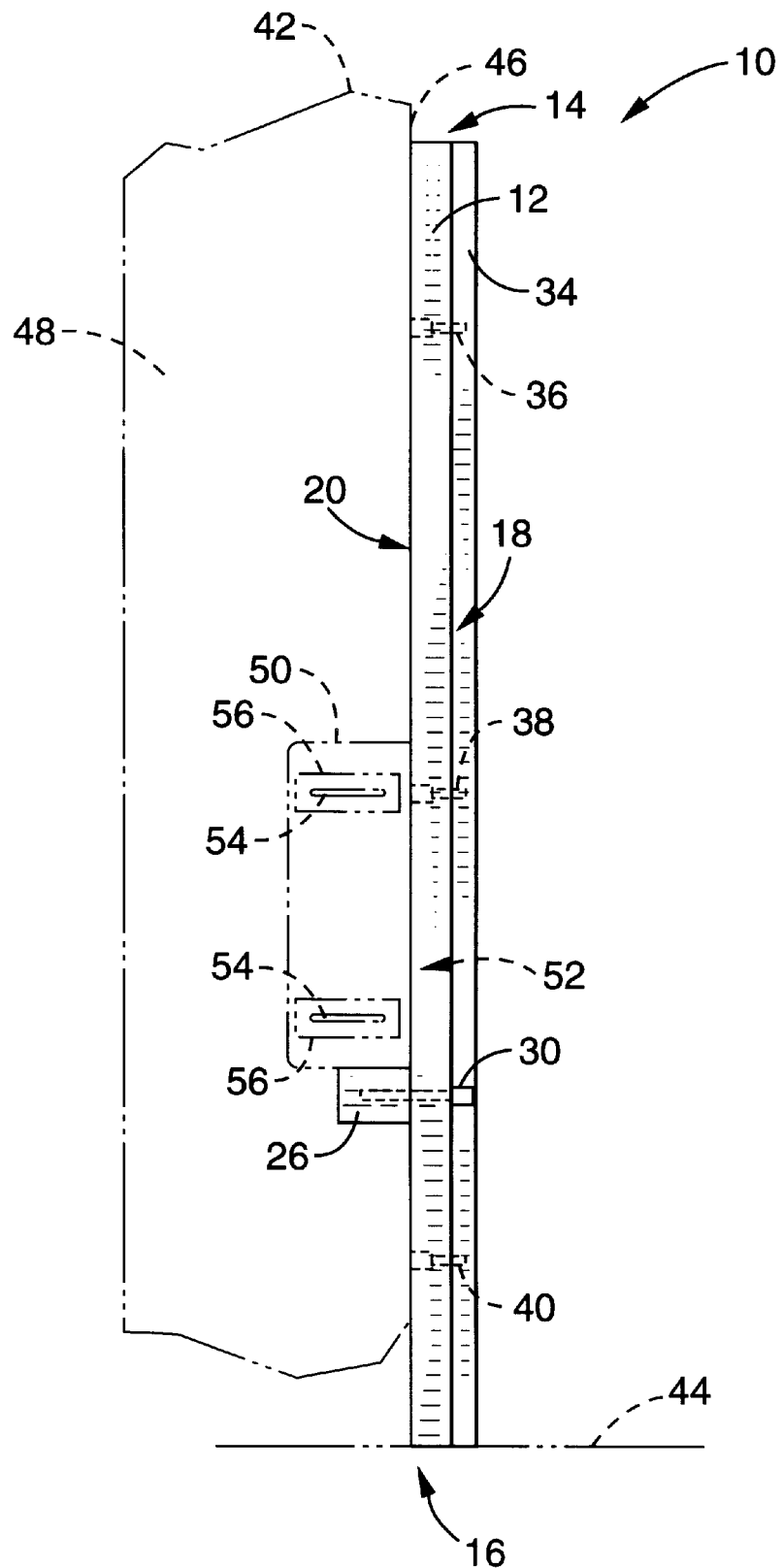
FIG. 6 is a side elevational view of the apparatus shown in FIG. 1 with the blocks positioned on the opposite side of the back plate and shown positioned adjacent to a metal stud and electrical box in phantom.

Referring to FIG. 2 and FIG. 6, it will be appreciated that apparatus 10 as shown in FIG. 1 and FIG. 2 can also be used for setting electrical boxes on metal studs without removal of spacer bar 34 as shown in FIG. 3 and FIG. 4. To use the embodiment shown in FIG. 1 and FIG. 2 with metal studs, blocks 26, 28 are positioned on back face 20 of back plate 12 instead of on front face 18. Since bolts 30, 32 can be removed from blocks 26, 28 and slots 22, 24, relocating blocks 26, 28 between front face 18 and back face 20 is easily accomplished. To use the apparatus 10 on a metal stud 42, the back face 20 is placed adjacent the front edge 46 of metal stud 42 and the first and second vertical position blocks 26, 28 are attached to the back face 20 of the back plate 12. Using the apparatus 10 on a wooden stud 42 simple entails repositioning blocks 26, 28 to the front face 18 of back plate 12 so that spacer bar 34 can be placed adjacent the front edge 46 of wooden stud 42.

Accordingly, it will be seen that this invention provides an electrical box setting guide apparatus for use with wood and metal wall studs during the construction of residential, commercial or other structures having electrical power outlets, which allows precise vertical and horizontal positioning of electrical boxes on studs, which automatically positions electrical box to be flush with subsequently installed drywall sheets, which eliminates the need for measuring with a tape measure, and which is quick and easy to use.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An electrical box setting apparatus, comprising:
   (a) a back plate, said back plate including a front face, a back face, a top end and a bottom end, said back plate including first and second generally parallel elongated slots positioned between said top and bottom ends of said back plate and longitudinally aligned with said back plate; and
   (b) first and second spaced-apart positioning blocks, said first positioning block slidably coupled to said first slot, said second positioning block slidably coupled to said second slot.

2. An apparatus as recited in claim 1, further comprising a spacer bar coupled to said back plate between said first and second positioning blocks.

3. An apparatus as recited in claim 2, wherein said spacer bar is detachable from said back plate.

4. A method for setting an electrical box on a wooden stud having a pair of sides and a front edge, using an apparatus as recited in claim 1, comprising the steps of:
   (a) attaching a spacer bar to said back plate between said first and second positioning blocks and generally parallel to said slots;
   (b) positioning said first and second positioning blocks until said blocks are in a desired vertical position relative to said top and bottom ends of said back plate;
   (c) placing said apparatus adjacent a wooden wall stud with said spacer bar abutting said front edge of said stud, said bottom end of said back plate adjacent a floor, and said stud between said positioning blocks;

(d) setting an electrical box on a positioning block;

(e) attaching said electrical box to said wooden stud; and (f) removing said apparatus from said wooden stud.

5. An electrical box setting apparatus, comprising:

(a) a back plate, said back plate including a front face, a back face, a top end and a bottom end, said back plate including first and second generally parallel elongated slots positioned between said top and bottom ends of said back plate and longitudinally aligned with said back plate;

(b) first and second spaced-apart positioning blocks, said first positioning block slidably coupled to said first slot, said second positioning block slidably coupled to said second slot; and (c) a spacer bar coupled to said back plate between said first and second positioning blocks.

6. An apparatus as recited in claim 5, wherein said spacer bar is detachable from said back plate.

7. A method for setting an electrical box on a wooden stud having a pair of sides and a front edge, using an apparatus as recited in claim 5, comprising the steps of:

(a) positioning said first and second positioning blocks until said blocks are in a desired vertical position relative to said top and bottom ends of said back plate;

(b) placing said apparatus adjacent a wooden wall stud with said spacer bar abutting said front edge of said stud, said bottom end of said back plate adjacent a floor, and said stud between said positioning blocks;

(c) setting an electrical box on a positioning block;

(d) attaching said electrical box to said wooden stud; and (e) removing said apparatus from said wooden stud.

8. A method for setting an electrical box on a metal stud having a pair of sides and a front edge using an apparatus as recited in claim 5, comprising the steps of:

(a) positioning said first and second positioning blocks until said blocks are in a desired vertical position relative to said top and bottom ends of said back plate;

(b) placing said apparatus adjacent a metal wall stud with said back plate abutting said front edge of said stud, said bottom end of said back plate adjacent a floor, and said stud between said positioning blocks;

(c) setting an electrical box on positioning block;

(d) attaching said electrical box to said metal stud; and (e) removing said apparatus from said metal stud.

* * * * *